United States Patent [19]

Miller

[11] Patent Number: 5,747,907
[45] Date of Patent: May 5, 1998

[54] BACKUP BEARINGS FOR POSITIVE RE-CENTERING OF MAGNETIC BEARINGS

[75] Inventor: Robin M. Miller, Ellington, Conn.

[73] Assignee: United Technologies Automotive, Inc., Dearborn, Mich.

[21] Appl. No.: 581,705

[22] Filed: Dec. 29, 1995

[51] Int. Cl.[6] .............................. H02K 7/08; H02K 7/09; H02K 7/10
[52] U.S. Cl. .............................. 310/90; 310/90; 310/90.5; 310/74; 310/103; 72/5.46; 72/572; 384/102
[58] Field of Search ....................... 310/90.5, 74, 92, 310/90, 103; 72/5.46, 572; 384/102

[56] References Cited

U.S. PATENT DOCUMENTS

| | | | |
|---|---|---|---|
| 3,841,173 | 10/1974 | Kraus | 74/751 |
| 4,480,881 | 11/1984 | Fujimori | 310/90 |
| 4,628,522 | 12/1986 | Ebersberger | 378/132 |
| 4,629,261 | 12/1986 | Eiermann et al. | 310/90.5 |
| 5,124,605 | 6/1992 | Bitterly et al. | 310/74 |
| 5,321,329 | 6/1994 | Hovorka | 310/90.5 |
| 5,398,571 | 3/1995 | Lewis | 74/572 |

OTHER PUBLICATIONS

McCann, Karen, "Wiff it fly? New flywheel technology isn't pie-in-the-sky", Sep. 1994, WARD's Auto World, p. 102.
Illman, Deborah L., "Automakers Move Toward New Generation of 'Greener' Vehicles", Aug. 1, 1994, Chemical & Engineering News, pp. 8–16.
Ashley, Steven, "Flywheels put a new spin on electric vehicles", Oct. 1993, Mechanical Engineering, pp. 44–51.
Ashley, Steven, "UT and BMW collaborate on flywheel system", Aug. 1994, Mechanical Engineering, p. 18.
Koprowski, Gene, "Fuel Cells and Flywheels", Feb. 1995, Automotive Industries, pp. 136 & 138.

Primary Examiner—Thomas M. Dougherty
Assistant Examiner—Karl Eizo Imayoshi Tamai
Attorney, Agent, or Firm—Howard & Howard

[57] ABSTRACT

Bearing systems, such as magnetic bearings, are widely used today in a variety of applications. All bearing systems are, however, subject to failure. Therefore, backup bearing systems are often utilized in conjunction with a main bearing system in order to provide backup to the main bearings if they should fail. The backup bearing system for the re-centering of magnetic bearings includes a first conical member disposed about an axis and having at least one bearing disposed substantially therein; a second conical member spaced from the first conical member and disposed about the axis, the second conical member having at least one bearing disposed substantially therein; and an actuator assembly spaced from the second conical member and bearing in a first or operative position. The actuator assembly acts to move the second conical member and bearings disposed therein between the first, operative position where the backup bearing system is operating to re-center the magnetic bearings, to a second, inoperative position, when the magnetic bearings are once again operating.

7 Claims, 6 Drawing Sheets fig.1 fig.2 fig.3A fig. 4 fig.5

BACKUP BEARINGS FOR POSITIVE RE-CENTERING OF MAGNETIC BEARINGS

BACKGROUND

1. Technical Field

The present application relates to backup bearings and especially to dual cone backup bearings for positive re-centering of magnetic bearings.

2. Background of Related Art

The flywheel, a balanced mass spinning around a constant axis that stores energy as rotational kinetic energy is one of humankind's earliest devices, serving as the basis for both the potter's wheel and the grindstone. Today, flywheel energy storage (FES) systems which store electric energy as kinetic energy and generate electric energy from the stored kinetic energy are being utilized for a number of applications. FES systems are currently being utilized in both mobile applications such as automotive and space applications, as well as stationary applications such as utility load-leveling systems, uninterrupted power supplies, and as storage capacity for solar and wind power systems. As is traditional, the term stationary refers to a system which is positioned primarily in a given geographic location as contrasted to a mobile system which is able to readily move between a variety of geographic locations.

FES systems generally include several principal components; namely a flywheel having a rotor and a hub, a motor/generator as well as magnetic bearings. Typically the system will also include a structural housing, a vacuum pump, electrical power input/output and electronic controls for the magnetic bearings.

It is known in the art to construct the flywheel rotor of high specific strength (i.e. strength/density) composite materials in order to optimize the flywheel's performance. The motor/generator is utilized to transfer electric power into the system to store it as kinetic energy when the system is acting as a motor and is also utilized to generate electric energy from the stored kinetic energy to transfer the electric energy out of the system when the system is operating as a generator. High-performance FES systems operate in a vacuum to minimize windage losses, aerodynamic heating and rotor instability. These high-performance systems therefore include a structural housing which also serves as a containment vessel to enclose any debris resulting from the failure of the rotor. Current FES systems also use magnetic bearings for supporting, or suspending the rotating flywheel within the housing.

Typically, the magnetic bearings utilized are either active or passive. In a typical active system the flywheel is suspended by magnetic forces created by the magnetic bearings. These forces, along with the loads that act on the flywheel, are controlled and balanced by position sensors and electronic feedback circuits working together to control the stability of the flywheel by introducing magnetic flux forces by controlling the currents in electromagnetic windings within the bearing assembly. Passive magnetic bearings, on the other hand, use powerful permanent magnets with specific geometries to support and stabilize the spinning flywheel without resorting to feedback control. Passive bearings help minimize parasitic losses while active bearings allow for more dynamic stability than passive bearings and are usefull in mobile applications, such as in automobiles where compensation for road shocks and rotor balance to avoid flywheel instability is important.

Magnetic bearings work very well in situations of low energy loss and low vibration when they are properly placed, or centered, and operating. However, if the flywheel is forced off-center or if there is an interruption in the power source the bearings may not be able to restore themselves and can abruptly fail. In order to minimize damage within the system due to failure, many flywheels utilize rolling element backup bearings placed along the inner diameter of the flywheel such that if the flywheel becomes misaligned such that it is no longer operating on the magnetic bearings the backup bearings will help prevent extensive damage to the entire system. When the magnetic bearings fail an event known in the art as "whirl" may occur. "Whirl" is when the flywheel spins around within the clearance required for the magnetic bearings thereby causing extremely high rotating forces on the stationary components in the system and on traditional backup bearings. "Whirl" can shorten the life of the backup bearings and creates additional stress on the flywheel which can cause the flywheel to be damaged and break. Although traditional backup bearings help during emergency failure, they do not prevent the "whirl" phenomena and therefore do not spin the flywheel down to rest without possible damage to the system. In addition, if the flywheel is forced off-center, but there is no interruption in power, traditional backup bearings do not help the magnetic bearings to re-center themselves to become active again.

A need therefore exists for a device which would enable the magnetic bearings to re-center so that they can become active again and/or to allow the flywheel to safely spin down to rest if there is an interruption in the power source to the magnetic bearings without allowing the system to "whirl".

The present application provides for a backup bearing system which enables positive re-centering of the magnetic bearings so that the bearings may become active again if the flywheel is forced off-center and also enables the flywheel to safely spin down to rest if there is an interruption in the power source to the magnetic bearings. The present system achieves both of these objectives without allowing "whirl" to occur.

SUMMARY

A backup bearing system for the re-centering of magnetic bearings is provided, the backup bearing system including: a first conical member disposed about an axis and having at least one bearing disposed substantially therein; a second conical member spaced from the first conical member and disposed about the axis, the second conical member having at least one bearing disposed substantially therein; a spring member; and an actuator assembly spaced from the second conical member and bearing in a first or operative position. The actuator assembly acts to move the bearings disposed substantially within the second conical member between the first, operative position where the backup bearing system is operating to re-center the magnetic bearings, to a second, inoperative position, when the magnetic bearings are once again operating.

In one embodiment the actuator assembly includes a magnetically conductive stator having windings disposed therein energizing the windings produces a magnetic field within the stator, the magnetic field attracting a magnetically conductive plate which is attached to the second conical member and bearings, thereby moving the magnetically conductive plate, the bearings and the second conical member from the first, operative position, into the second, inoperative position, in contact with the stator. To move the bearings back into the operative position the magnetic field is cut and the force of a compression spring moves the magnetically conductive plate, the bearings and the second conical member back into the first, operative position.

In another embodiment the actuator assembly includes a piston attached at one end to the inner diameter of the bearings disposed within the second conical member. The actuation of the piston thereby moves the bearings and second conical member between the first, operative position, and the second, inoperative position.

BRIEF DESCRIPTION OF THE DRAWINGS

Various embodiments are described herein with reference to the drawings, wherein.

The figures are meant to further illustrate the present application and not to limit the scope thereof.

DETAILED DESCRIPTION OF THE PREFERRED EMBODIMENTS

Figure 1:
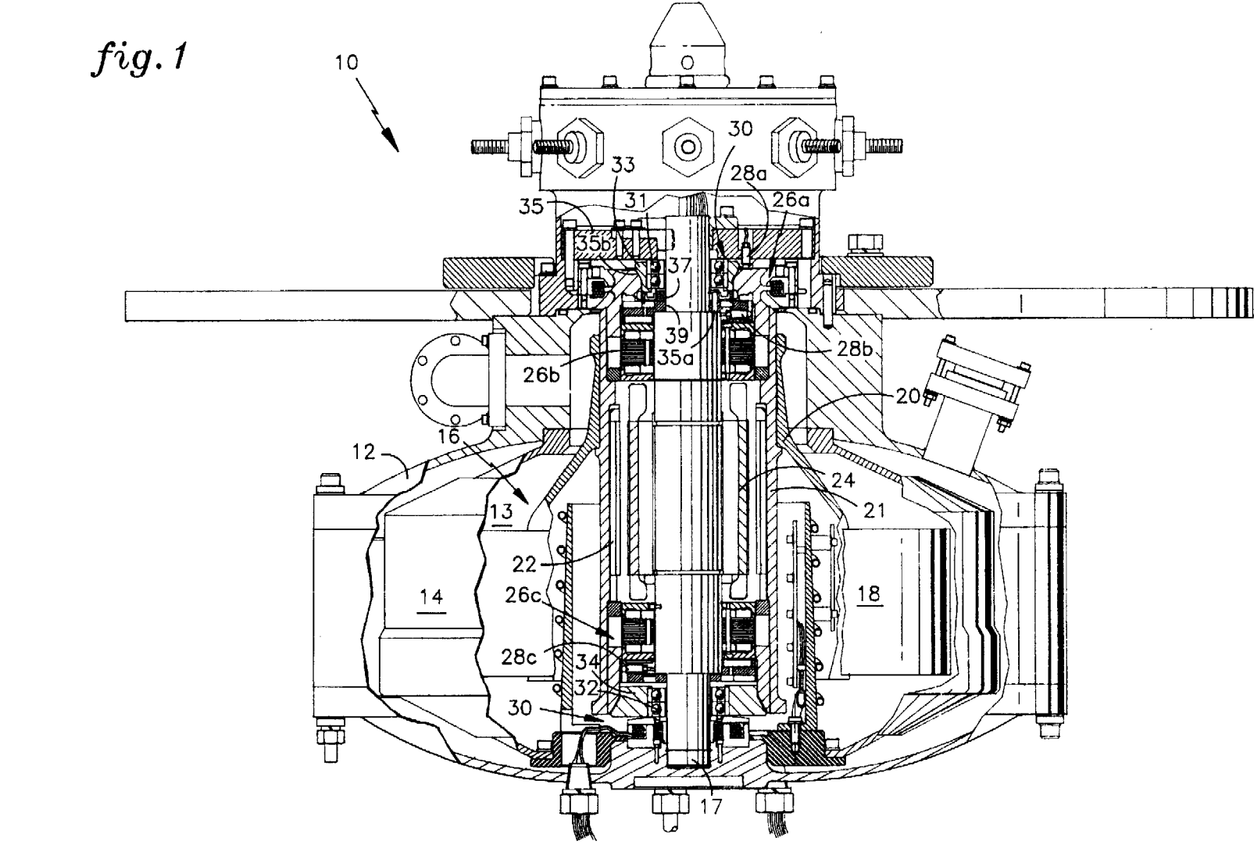
FIG. 1 is a cross-sectional view of a Flywheel Energy Storage (FES) system utilizing one embodiment of a backup bearing assembly according to the present application.

Referring now to FIG. 1 there is illustrated a cross-sectional view of one embodiment of a Flywheel Energy Storage (FES) system 10 according to the present application. System 10 consists of an outer vacuum housing 12, an inner containment ring 14, a rotating flywheel assembly 16, a stationary shaft 17, a motor/generator 24 and main bearings 26a,b,c. System 10 is preferably designed to store a total energy of 800 Watt-hours (Wh) at a maximum speed of approximately 35,000 Revolutions per minute (rpm). The usable energy storage at constant power is 600 Wh over an operating range from about 17,000 rpm to approximately 35,000 rpm. The rated power of the system is 25 kilowatts (kW) throughout the operating range, with approximately 50 kW available for several seconds at the maximum speed.

Housing 12 encloses vacuum chamber 13 in which the flywheel assembly 16 operates. Inner containment ring 14 helps contain any debris resulting from failure of the flywheel assembly 16, if failure should occur. Inner containment ring 14 which is located about flywheel assembly 16 is preferably made of a high tensile strength material, such as steel, in order to withstand the momentum of impact from any debris resulting from flywheel failure. Although the present embodiment utilizes a housing 12 in conjunction with a containment ring 14, a number of various containment systems may be utilized by one of skill in the art. The design of any containment system requires knowledge of: 1) the failure mode of the flywheel, 2) the kinematics of the failed pieces, and 3) response of the containment system. By evaluating each of these criteria one of skill in the art can design a suitable containment system for a particular FES system.

In the present embodiment the motor/generator 24 is a brushless permanent magnet motor which is water-cooled so as to maximize motor power density (watt/kg) and efficiency and to minimize energy dissipation in the flywheel assembly which operates in vacuum chamber 13. The motor/generator 24 spins the flywheel assembly 16 up to speed to transfer electric power into the system to store it as kinetic energy when the system is acting as a motor and also operates to generate electric energy from the stored kinetic energy to transfer the electric energy out of the system by coupling to the flywheel assembly when the system is operating as a generator, as is known in the art. In the present embodiment, motor/generator 24 is designed to be a 25 kw, 25% duty factor, 180 V permanent magnet, 3 phase motor with 50 kw maximum input and output. Alternate motor/generators may be utilized depending upon the particular application for the FES system.

With continued reference to FIG. 1, flywheel assembly 16 consists of a composite rotor 18, a hub 20 and a cylinder 21 which contains back-iron 22 of the motor/generator 24 and the rotors of bearings 26a,b,c. Although the present embodiment utilizes a composite rotor, other types of rotors including metallic rotors may also be utilized, especially for low energy, high power applications. A composite rotor is, however, preferred as optimal energy storage of a FES system can be accomplished by maximizing the ratio of energy to mass, termed the energy density, and the greatest energy density is found using the highest specific tensile strength flywheel material. Lightweight composite materials, consisting of fibers in a matrix, typically have very high material strengths relative to their mass densities. In addition, metallic rotors tend to shatter into sharp piercing fragments if failure occurs while composite rotors do not. Regardless of the material utilized, some factors which determine the design of the flywheel assembly include the desired energy storage capacity, cost, number of cycles and size constraints, etc. all of which are related to the application for which the FES system will be utilized. Flywheel assembly 16 is supported by main bearings 26a,b,c as it rotates about shaft 17.

In the present embodiment main bearings 26a, b, c are preferably active magnetic bearings and include an axial magnetic bearing 26a as well as a pair of radial magnetic bearings 26b, c. Active magnetic bearings are the preferred method of providing support to flywheel assembly 16 because they have low frictional losses, high speed capability, are compatible with a vacuum environment (i.e., do not require lubrication) and because they allow for active control of the flywheel assembly. The axial magnetic bearing 26a suspends the flywheel assembly 16 within housing 12 while the radial magnetic bearings 26b,c align the flywheel assembly 16 about shaft 17, as is known in the art. In the present embodiment the radial bearings 26b,c can each take a 150 lbs of load. Sensors 28a, b, c are connected through a path to each active bearing axis for each bearing 26a,b,c, respectively, for a total of five axis (radial bearings x and y axis, axial bearing z axis) for the three bearings. Sensors 28 are proximity sensors which provide electronic feedback in order to control the stability of the flywheel assembly by digitally controlling the bearing properties and operation in order to properly place the bearings and the flywheel relative to each other.

In the present embodiment magnetic bearings 26a, b, c are permanent magnet biased active bearings operating constantly at speeds over 1000 rpm although other magnetic bearings which would be known to those skilled in the art may be utilized depending upon the particular application.

Magnetic bearings 26a, b, c work well in most operating situations but do have load limits and may become unstable or even fail due to many reasons including, but not limited to, loss of power. There is therefore provided in the present application backup-bearing assembly 30 which provides backup to magnetic bearings 26a, b, c in situations where the magnetic bearings 26a, b, c become unstable or fail.

Figure 2:
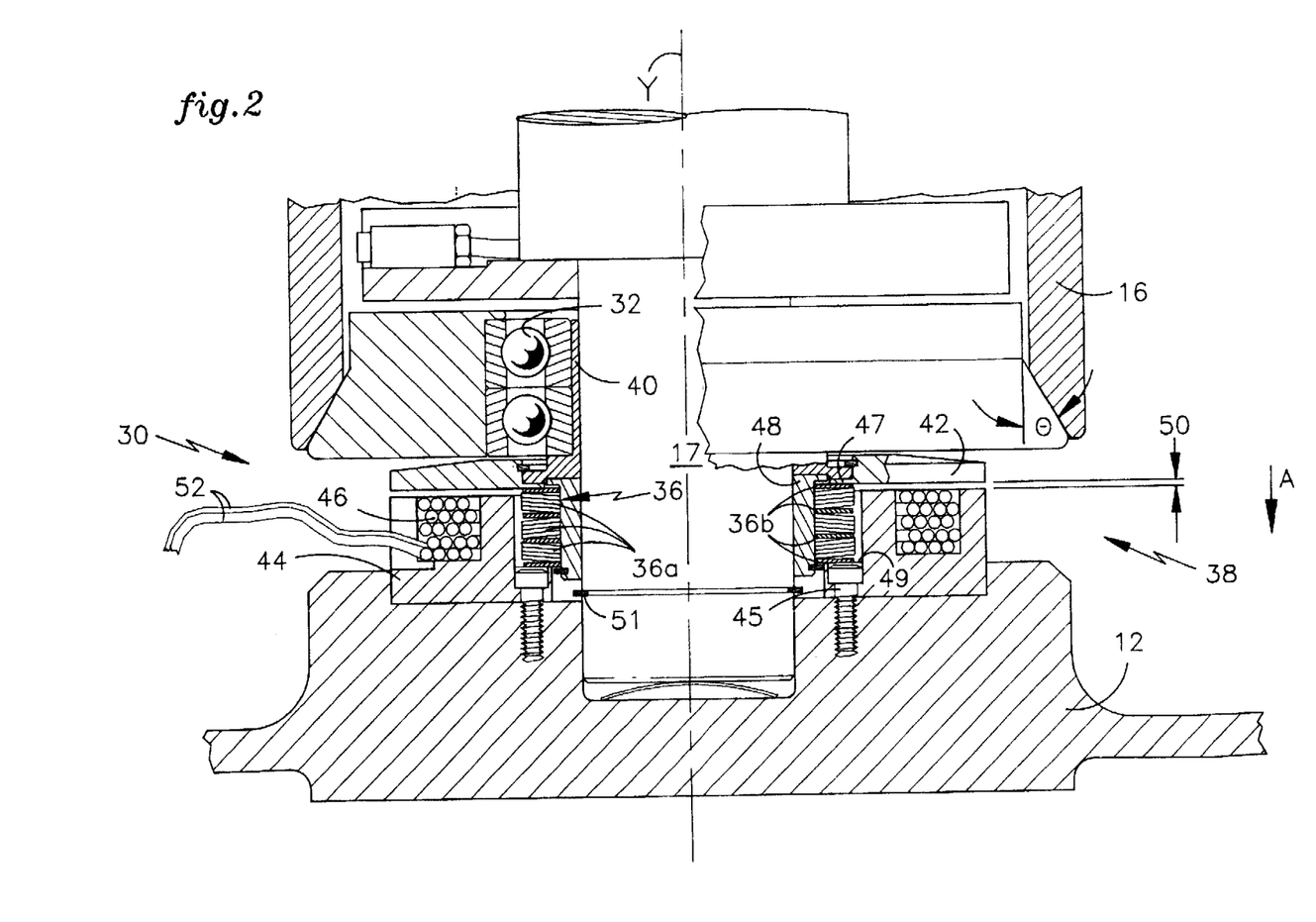
FIG. 2 is an enlarged view in partial cross-section and partially broken-away of one part of the backup bearing assembly of FIG. 1, in engagement with the flywheel assembly.

Referring now to FIG. 2, there is illustrated an enlarged cross-sectional view of backup-bearing assembly 30. Backup-bearing assembly 30 includes a first, double row of rolling element bearings 31 (FIG. 1) disposed substantially within a first conical member 33 (FIG. 1), a second, double row of rolling element bearings 32 disposed substantially within a second conical member 34, and an actuator assembly 38 adjacent to conical member 34.

In the present embodiment rolling element bearings 31, 32 are preferably double row, angular contact, outer diameter rotating, self-lubricating bearings which are 35 mm in diameter and include ceramic balls as the rolling element, although alternate sizes and materials such as steel may be utilized, as long as acceptable bearing life is achieved. Whatever types of bearings are utilized for backup, the bearings should have low friction losses, be capable of operating in a vacuum (i.e. are "dry" lubricated) and should also have very little temperature generation during operation. In addition, upon actuation the rolling element bearings contact the rotor and "spin-up" to speed which creates a high centrifugal loading on the rolling elements. Since the rolling element speed depends upon the bearing diameter and rpm, in order to minimize this loading the bearing diameter should be as small as possible for the given load application, as will be known to one of skill in the art.

Bearings 31, 32 and conical members 33, 34 are disposed about shaft 17. Bearing 31 is disposed about shaft 17 between bearing plate 35 and members 37, 39. Shaft 17 is preloaded such that conical member 33 and bearings 31 are axially stationary with respect to shaft 17. Conical member 34 and bearings 32 are mounted to a bearing carrier plate 40 which is disposed between conical member 34 and shaft 17. Bearing carrier plate 40 is preferably disposed about shaft 17 with a close sliding fit for longitudinal movement thereal- ong. In the present embodiment the diametric fit is in the range of approximately 0.0004–0.0010 of an inch between carrier plate 40 and shaft 17. Bearing carrier plate 40 operates to move conical member 34 and bearings 32 longitudinally along shaft 17 and can therefore be fitted about shaft 17 in any suitable manner which would allow carrier plate 40 to move longitudinally along the shaft 17. Attached to bearing carrier plate 40 by a clearance fit with a snap ring is reactor plate 42. Reactor plate 42, alternatively, may be attached to carrier plate 40 in any suitable manner. Reactor plate 42 is disposed between actuator assembly 38 and conical member 34 and is preferably composed of a highly magnetically conductive material, such as Remko-B™ material available from Arnold Engineering located in Illinois, or any other suitable material which exhibits high permeability such as iron or low carbon steel, etc. Although shown as two elements, bearing carrier plate 40 and reactor plate 42 may be made as a single, unitary structure.

With continuing reference to FIG. 2, actuator assembly 38 includes stator 44 which is mounted to housing 12 by bolts 45, although alternative methods of attachment may be utilized as long as stator 44 remains stationary. Stator 44 includes windings 46 disposed therein and is preferably made of a highly conductive material, such as Remko-B™ material, although other highly magnetically conductive material may be utilized. Actuator assembly 38 further includes a compression spring member 36 consisting of a number of "wavy washers" 36a available from Smalley Spring of Illinois with spacers 36b disposed between the washers. In the present embodiment three groups of washers are utilized with a total of four spacers in order to create an even force across the fall range of the spring, although various other configurations may be utilized. Wavy washers are preferred because they create an axial force in a very small area, but alternative spring configurations such as a standard coil compression spring may also be employed.

Spring member 36 is compressed at one end against shoulder 47 of reactor plate 42 and is compressed at an opposite end against shoulder 49 of stator 44. Spring carrier 48 is slidingly disposed about shaft 17 and is retained about shaft 17 by retaining ring 51. The operation of the backup bearing assembly 30 will now be described with reference to FIGS. 2–3A.

Figure 3A:
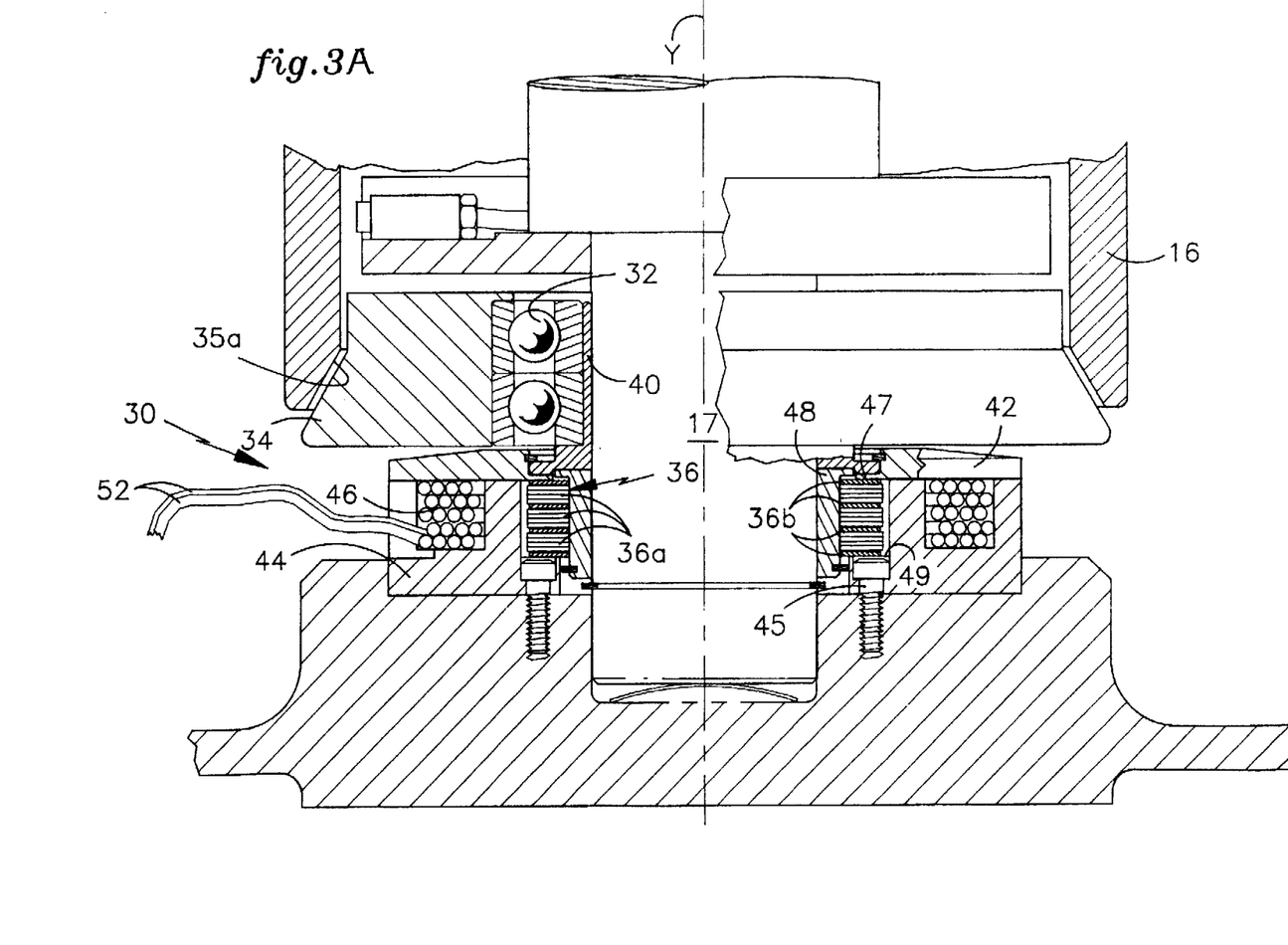
FIG. 3A is an enlarged view in partial cross-section and partially broken-away of the embodiment of FIG. 2 out of engagement with the flywheel assembly.
Figure 3B:
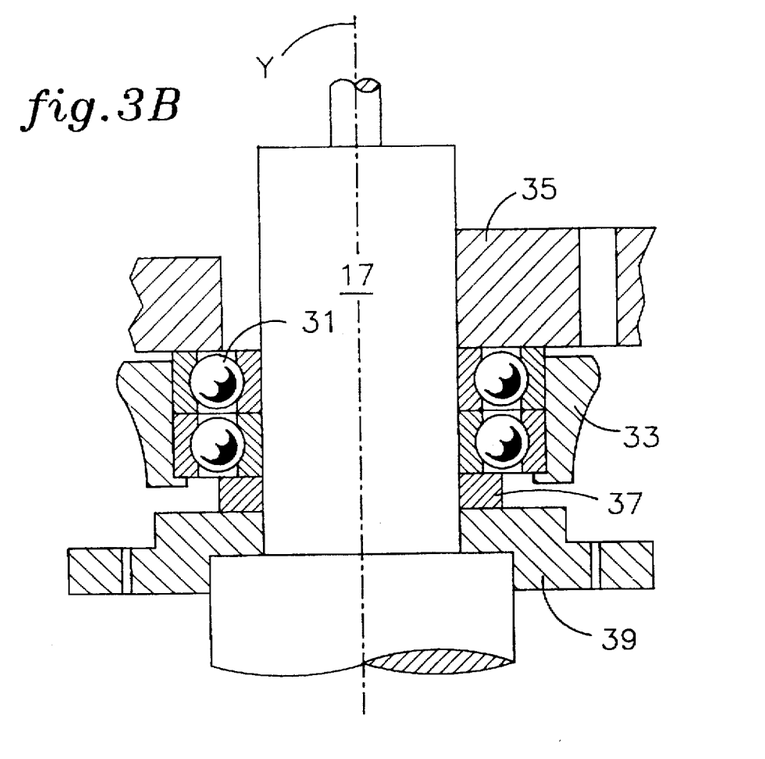
FIG. 3b is an enlarged view in partial cross-section and partially broken-away of another part of the backup bearing assembly of FIG. 1.

As shown in FIG. 2, in a first or "operative" position reactor plate 42 is disposed at a predetermined distance from stator 44, represented in the present embodiment as gap 50. In order to close gap 50 windings 46 cycle around to produce a magnetic field having a North and South pole which attracts reactor plate 42 thereby moving reactor plate 42, bearing carrier plate 40, conical member 34 and bearings 32 longitudinally along shaft 17 in the direction of arrow "A". Movement in the direction of arrow A causes reactor plate 42 into contact with stator 44, thereby closing gap 50 and moving the backup bearing assembly into a second or inoperative position as illustrated in FIG. 3A. When in the inoperative position spring member 36 is in a compressed state and exerts a constant force of approximately 100 lbs as illustrated by arrows "C" and "D"

In the present embodiment in order to move the backup bearings into the "inoperative" position the actuation assembly is activated with a short pulse of high current, approximately 5 Amps which pulls the reactor plate 42 into contact with stator 44 as described above. The current is supplied through electrical leads 52 which are connected at one end to the windings and are connected at an opposite end to an exterior control box (not shown) as is known in the art. Reactor plate 42, conical member 34 and bearings 32 are held in the "inoperative" position in contact with stator 44 of actuation assembly 38, and away from contact with flywheel assembly 16 by a trickle current of approximately 0.2 Amps.

If flywheel assembly 16 experiences mechanical failure and moves off-center from shaft 17 thereby causing magnetic bearings 26a,b,c to become misaligned, or if the magnetic bearings are not properly aligned for any reason, including electric failure of the bearings, the proximity sensors' 28a,b,c output value will exceed a predetermined level in the control box. Upon the output value of the proximity sensors 28a,b,c exceeding the predetermined level, the control box will cut the current running from the control box to the stator 44 via electrical leads 52 thereby disabling the magnetic field which holds reactor plate 42 in contact will stator 44. Once the magnetic field is disabled the force from spring member 36 is free to push the reactor plate 42, bearing carrier plate 40, conical member 34 and bearings 32 in the direction of arrow "B" into contact with flywheel assembly 16. Conical member 34 and bearings 32 contact flywheel assembly 16 at one end thereof thereby forcing the flywheel assembly into contact with conical member 33 and bearings 31.

Flywheel assembly 16 preferably includes a conical shaped contact surface 35a,b on either end corresponding to the shape of conical members 33, 34 such that upon contact with conical members 33, 34 the motion of the flywheel assembly 16 is contained between the conical members in each direction until re-alignment of the flywheel assembly 16 about shaft 17 has occurred. Contact surfaces 35a,b are preferably low friction surfaces so as to limit the heating and wear on the contact surfaces. Contact surfaces 35a,b are preferably disposed at an angle θ with respect to center axis "Y" of shaft 17 so as to create a greater re-centering force when contacting rotating flywheel assembly 16. The narrower angle θ is, the greater the centering force on flywheel assembly 16. In the present embodiment θ is between approximately 15°–60°, with an angle of approximately 30° being illustrated in FIG. 2, the 30° angle creating approximately 150–200 lbs of constant re-centering force when conical member 34 is engaged with flywheel assembly 16. Although a conical shape is shown in the present embodiment other shapes which would allow for re-alignment of the flywheel assembly 16, such as an oval shape may be utilized provided that the flywheel assembly has a corresponding shape for low friction engagement with the backup bearing assembly and the re-centering force is sufficient to re-align the flywheel assembly 16.

Because the motion of flywheel assembly 16 is constrained by conical members 33, 34 the flywheel assembly is prevented from experiencing "whirl" and is able to re-align itself about shaft 17 thereby allowing magnetic bearings 26a,b,c to re-center and become active again. In addition, the backup bearing of the present embodiment also acts as a fail-safe if there is an interruption in power. If power to the FES system is interrupted for any reason, then the current to the stator 44 is cut, the magnetic field is disabled and the backup bearing assembly is activated as described above. This allows the flywheel assembly 16 to safely spin down to rest because the motion of the flywheel assembly 16 is once again positively located between the conical members 33, 34 in each direction thereby preventing any "whirl" from occurring.

The present embodiment therefore provides for a backup bearing system which enables positive re-centering of the magnetic bearings so that the bearings may become active again if the flywheel is forced off-center and also enables the flywheel to safely spin down to rest if there is an interruption in the power source to the magnetic bearings. The present system achieves both of these objectives without allowing "whirl" to occur. In addition, the present embodiment is easy to manufacture, is cost effective, durable and may also be utilized during transportation of the FES system in order to hold the flywheel assembly without significant movement which could otherwise cause damage to the system during transport.

Figure 4:
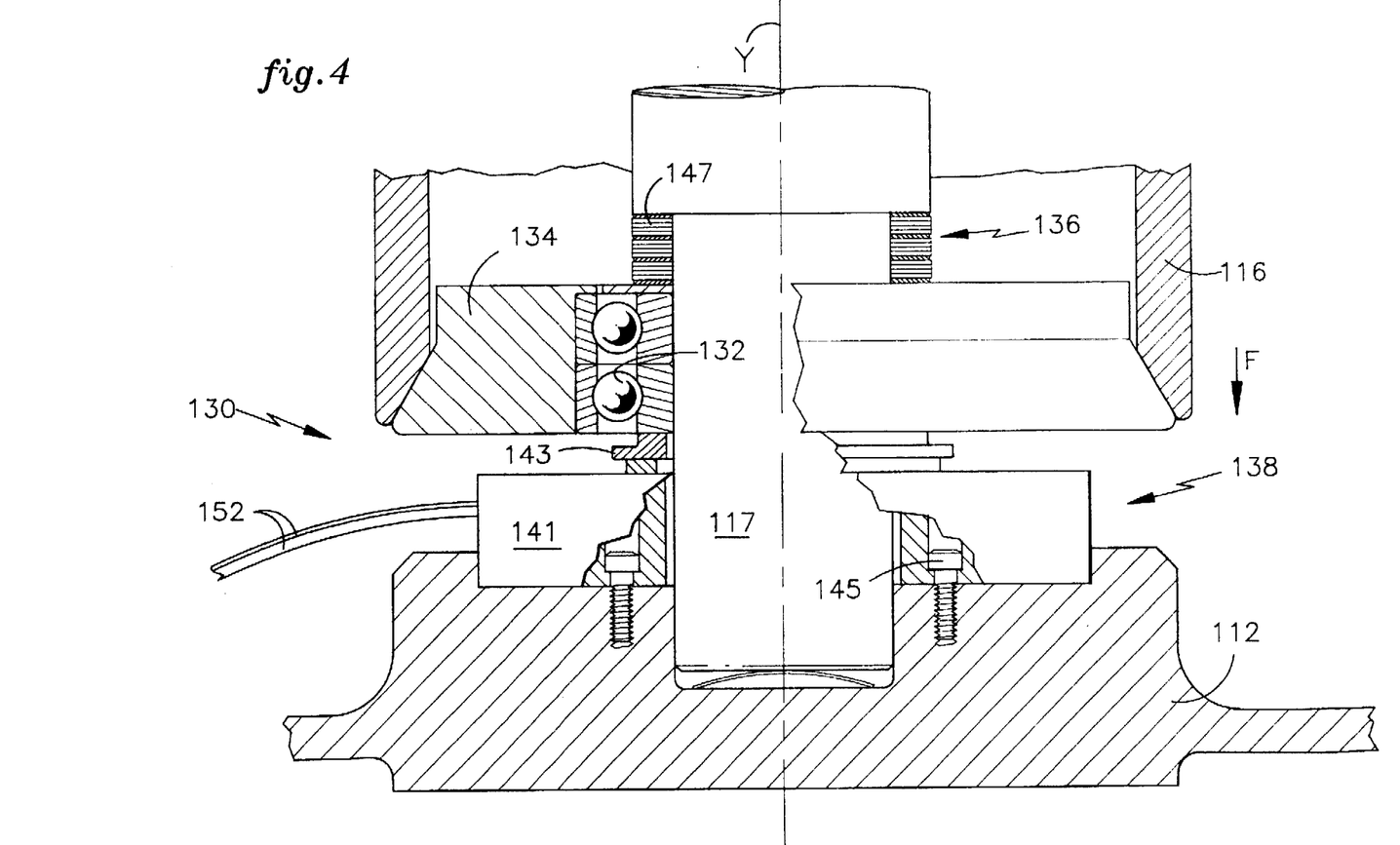
FIG. 4 is an enlarged view in partial cross-section and partially broken-away of another embodiment of a backup bearing assembly according to the present application in engagement with the flywheel assembly.

Referring now to FIG. 4, there is illustrated an enlarged cross-sectional view of an alternate embodiment of a backup-bearing assembly 130 for a Flywheel Energy Storage (FES) System 110. Like or similar elements shown in the embodiment of FIG. 4 are identified by the same reference numeral as in FIGS. 1–3, preceded by the numeral "1". Backup bearing assembly 130 includes a first, double row of rolling element bearings 131 (not shown) disposed substantially within conical member 133 (not shown), a second, double row of rolling element bearings 132 disposed substantially within conical member 134, a spring member 136 and an actuator assembly 138 adjacent to conical member 134. Bearings 131, 132 are substantially similar to rolling element bearings 31, 32 described hereinabove.

Conical member 133 (not shown) is disposed about shaft 117 at one end thereof, shaft 117 being preloaded such that conical member 133 and bearings 131 (not shown) are substantially stationary with respect to shaft 117 as described above with respect to conical member 33 and bearings 31. Conical member 134 and bearings 132 are preferably disposed about shaft 117 at an opposite end thereof, with a close sliding fit for longitudinal movement along shaft 117. Conical member 134 and bearings 132 are also connected to an actuator assembly 138 which employs the conical member 134 and backup-bearings 132 longitudinally along shaft 117. Actuator assembly 138 includes a piston 143 attached at one end to the inner diameter of bearings 132 thereby allowing for actuation of conical member 134 and bearings 132 while bearings 132 rotate freely. Actuator assembly 138 is connected to an exterior control box (not shown) as is known in the art, and further includes a base 141 mounted to housing 112 by bolts 145, although alternative methods of attachment may be utilized as long as base 141 remains stationary. Actuator assembly 138 may be any of a number of types of actuators including, but not limited to, hydraulic, solenoid or air actuators, all of which are known in the art.

Backup bearing assembly 130 further includes a spring member 136 which is compressed at one end against shoulder 147 of shaft 117 and is compressed at an opposite end against bearing 132. Spring member 136 is slidingly disposed about shaft 117, for longitudinal movement thereabout. Spring member 136 is preferably a wavy washer thrust spring which is utilized in the present embodiment to return the backup bearing assembly to its "inoperative" position, out of contact with flywheel assembly 116. The operation of the backup bearing assembly 130 will now be described with reference to FIGS. 4–5.

Figure 5:
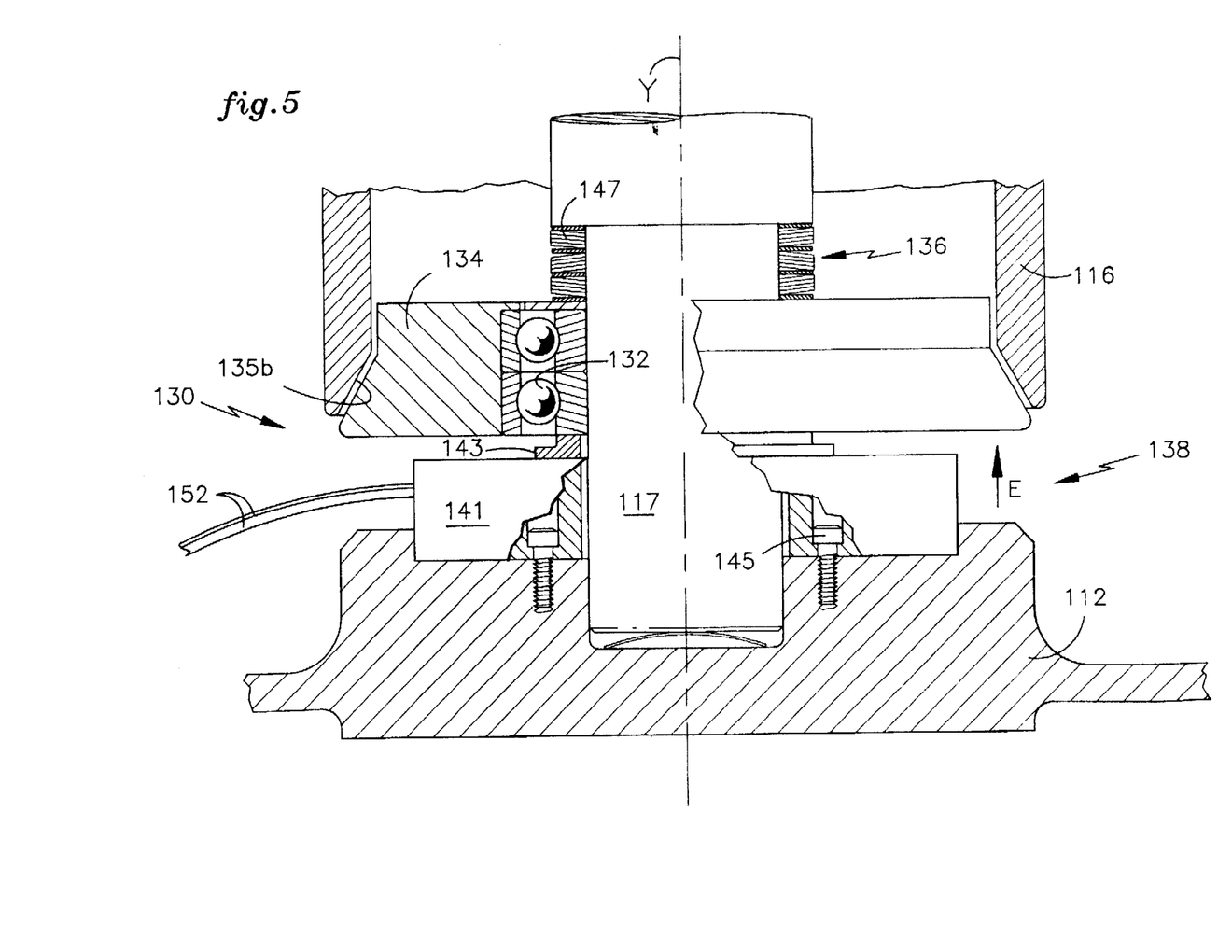
FIG. 5 is an enlarged view in partial cross-section and partially broken-away of the embodiment of FIG. 4 out of engagement with the flywheel assembly.

As shown in FIG. 5, in the "inoperative" position piston 143 is substantially disposed within base 141 and spring member 136 exerts a force on bearing 132 thereby retaining conical member 134 and bearings 132 out of contact with flywheel assembly 116. In order to move the backup bearings from the "inoperative" position out of contact with the flywheel assembly 116 to an "operative" or actuated position, in contact with the flywheel assembly, piston 143 must be employed in the direction of arrow "E" and overcome the force exerted on bearing 132 by spring member 136.

If flywheel assembly 116 moves off-center from shaft 117 thereby causing the magnetic bearings (not shown) to become misaligned, or if the magnetic bearings are not properly aligned for any reason, proximity sensors (not shown) which provide electronic feedback to the control box in order to properly place the magnetic bearings and the flywheel assembly relative to each other, emit an output value which exceeds a predetermined level in the control box. Upon the output value of the proximity sensors exceeding the predetermined level, the control box will supply a signal to the actuator assembly via electrical leads 152 to actuate piston 143 in the direction of arrow "E". The force created by piston 143 on bearing 132 upon actuation must exceed the force created on bearing 132 by spring member 136, which for spring member 136 is approximately 5–10 lbs of force, in order to move conical member 134 and backup bearings 132 in the direction of arrow "E" and into contact with flywheel assembly 116. Once the force of spring member 136 is exceeded, piston 143 is free to push conical member 134 and bearings 132 in the direction of arrow "E" into engagement with flywheel assembly 116. Upon engagement of conical member 134 and bearings 132 with flywheel assembly 116 at one end thereof, the loading force on the flywheel assembly 116 created by piston 143 must be great enough to push flywheel assembly 116 into contact with conical member 133 and bearings 131. In order to overcome the force of spring member 136 and to create a force sufficient to force the flywheel assembly 116 into contact with conical member 133, the piston 143 in the present embodiment creates approximately 100 lbs of force, or greater.

Flywheel assembly 116 preferably includes a conical shaped contact surface 135a,b on either end corresponding to the shape of conical members 133, 134 such that upon contact with conical members 133, 134 the motion of the flywheel assembly 116 is contained between the conical members in each direction until re-alignment of the flywheel assembly 116 about shaft 117 has occurred. Contact surfaces 135a,b are preferably low friction surfaces so as to limit the heating and wear on the contact surfaces. Although a conical shape is shown in the present embodiment other shapes which would allow for re-alignment of the flywheel assembly 116, such as an oval shape may be utilized provided that the flywheel assembly has a corresponding shape for low friction engagement with the backup bearing assembly.

After flywheel assembly 116 has become re-aligned about shaft 117 and the magnetic bearings have become active, the proximity sensors' output value will fall within the predetermined level in the control box. Upon the output value of the proximity sensors falling within the predetermined level, the control box will signal the actuator assembly to de-actuate and the force on conical member 134 from spring member 136 will exceed the force created by piston 143 on bearing 132 thereby moving conical member 134, bearings 132 and piston 143 in the direction of arrow F (FIG. 4), into the inoperative position, out of contact with flywheel assembly 116.

Because the motion of flywheel assembly 116 is contained by conical members 133, 134 the flywheel assembly is prevented from experiencing "whirland" is able to re-align itself about shaft 117 thereby allowing the magnetic bearings to re-center and become active again. In addition to providing re-alignment of the flywheel assembly and positive re-centering of the magnetic bearings, the present embodiment may also be utilized as a one time fail-safe device.

If failure of the FES system occurs and/or if the magnetic bearings are permanently disabled the proximity sensors output value would reach a predetermined level set in the control box, the predetermined level indicating failure of the system. Upon failure the control box is set to activate the actuator assembly in a permanent method by a separate control device, such as by releasing a pin in a $CO_2$ cartridge (not shown) which would actuate the piston in case of failure, such as loss of power. Actuation would result in the flywheel assembly operating on the back-up bearing assembly instead of the magnetic bearings until the flywheel assembly 116 safely spins down to rest between the conical members 133, 134. The motion of the flywheel would once again be contained between the conical members 133, 134 in each direction thereby preventing any "whirl" from occurring.

The present embodiment therefore provides for a backup bearing system which enables positive re-centering of the magnetic bearings so that the bearings may become active again if the flywheel is off-center and also acts as a one time fail-safe device enabling the flywheel to safely spin down to rest if there is a failure of the system. The present system achieves both of these objectives without allowing "whirl" to occur. In addition, the present embodiment is easy to manufacture, cost effective and durable.

It will be understood that various modifications may be made to the embodiments disclosed herein. For example, the bearing assembly may be bushings instead of bearings, the magnetic bearings may instead be air bearings, and the backup bearing assembly may be used with other systems which utilize magnetic or air bearings, other than a flywheel energy storage system. In addition, although the stationary shaft of the present application is shown as being vertical, the shaft may alternatively be disposed horizontally or at an angle. Therefore, the above description should not be construed as limiting, but merely as exemplifications of preferred embodiments. Those skilled in the art will envision other modifications within the scope and spirit of the claims appended hereto.

I claim:

1. A flywheel system used to store kinetic energy, said flywheel system comprising:
   a housing enclosing a vacuum chamber;
   a stationary shaft disposed within said housing;
   a rotating flywheel assembly disposed about said stationary shaft;
   an electric machine for transferring electric power into said flywheel assembly when said flywheel assembly is acting as a motor, said electric machine also generating electric energy from the stored kinetic energy in order to transfer said electric energy out of said flywheel assembly;
   at least one main bearing disposed about said stationary shaft; and
   a backup bearing assembly, said backup bearing assembly comprising:
   i) a first member disposed about said shaft, said first member having at least one bearing disposed substantially therein;
   ii) a second member spaced from said first member and disposed about said shaft, said second member having at least one bearing disposed substantially therein, said bearing of said second member having an inner diameter;
   iii) a compression spring compressed against a shoulder of said shaft at one end, and further compressed at an opposite end against said bearing disposed within said second member, wherein said spring member forces said backup bearing assembly into an inoperative position, out of contact with said flywheel assembly; and
   iv) an actuator assembly for moving said second member and said at least one bearing disposed substantially therein upon failure of said main bearings, said actuator assembly including a piston, said piston attached to said inner diameter of said at least one bearing disposed substantially within said second member, wherein activation of said actuator assembly exerts a force on said second member and said at least one bearing disposed substantially therein, wherein said force exerted by said actuator assembly employs said second member and said at least one bearing longitudinally along said shaft, into an operative position, in contact with said flywheel assembly, while allowing said bearing therein to rotate freely.

2. The flywheel assembly of claim 1, wherein said at least one main bearing is a magnetic bearing.

3. The flywheel assembly of claim 1, wherein said shaft is preloaded such that said first member and said at least one bearing disposed substantially therein, are substantially axially stationary with respect to said shaft.

4. The flywheel assembly of claim 1, wherein said second member and said at least one bearing disposed substantially therein, are movable longitudinally with respect to said shaft.

5. The flywheel assembly of claim 1, wherein said spring member is slidingly disposed about said shaft, and is longitudinally movable with respect to said shaft.

6. The flywheel assembly of claim 1, wherein said actuator assembly is connected to an exterior control box and further includes a base mounted to said housing.

7. The flywheel assembly of claim 6, wherein in said inoperative position said piston is substantially disposed within said base of said actuator assembly.

* * * * *